US012674068B2

(12) United States Patent
Saito et al.

(10) Patent No.: US 12,674,068 B2
(45) Date of Patent: Jul. 7, 2026

(54) RADIATION CURABLE INK JET COMPOSITION

(71) Applicant: SEIKO EPSON CORPORATION, Tokyo (JP)

(72) Inventors: Toru Saito, Yamagata (JP); Toshiyuki Yoda, Matsumoto (JP); Yoshinobu Yoshida, Shiojiri (JP); Kiyoshi Nakamura, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 825 days.

(21) Appl. No.: 18/079,912

(22) Filed: Dec. 13, 2022

(65) Prior Publication Data

US 2023/0407120 A1 Dec. 21, 2023

(30) Foreign Application Priority Data

Dec. 14, 2021 (JP) ................................. 2021-202231

(51) Int. Cl.
*C09D 11/38* (2014.01)
*C09D 11/101* (2014.01)

(52) U.S. Cl.
CPC ............ *C09D 11/38* (2013.01); *C09D 11/101* (2013.01)

(58) Field of Classification Search
None
See application file for complete search history.

(56) References Cited

U.S. PATENT DOCUMENTS

| | | | | |
|---|---|---|---|---|
| 8,664,291 B2 * | 3/2014 | Kida | C09D 11/322 522/182 |
| 9,846,263 B2 * | 12/2017 | Breitkopf | C09D 11/101 |
| 10,799,911 B2 * | 10/2020 | Hall | C09D 11/36 |
| 2007/0225397 A1 * | 9/2007 | Nasvadba | C08K 5/3435 522/167 |
| 2012/0083545 A1 | 4/2012 | Kida et al. | |

FOREIGN PATENT DOCUMENTS

| | | |
|---|---|---|
| CN | 102618114 A | 8/2012 |
| EP | 2481781 A2 | 8/2012 |
| JP | 2012-092291 A | 5/2012 |
| JP | 2012-158672 A | 8/2012 |
| JP | 2012-167246 A | 9/2012 |

* cited by examiner

*Primary Examiner* — Sanza L. McClendon
(74) *Attorney, Agent, or Firm* — Harness, Dickey & Pierce, P.L.C.

(57) ABSTRACT

A radiation curable ink jet composition contains: a dispersant; a polymerizable compound; and a hindered amine compound represented by the following general formula (1) or (2), the radiation curable ink jet composition has a viscosity of 50 mPa·s or less at 25° C., and the dispersant has an acid value of 30 mgKOH/g or more,

[Chem. 1]

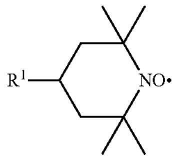

(1)

In the formula (1), $R^1$ represents H—, O═, or $R^2$—CO—, and $R^2$ represents an alkyl group having 1 to 6 carbon atoms or a substituted or unsubstituted aromatic ring,

[Chem. 2]

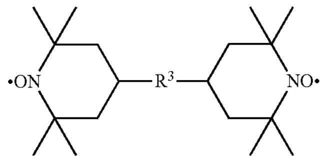

(2)

In the formula (2), $R^3$ represents —OCO—$R^4$—COO—, and $R^4$ represents an alkyl group having 1 to 12 carbon atoms.

4 Claims, No Drawings

RADIATION CURABLE INK JET COMPOSITION

The present application is based on, and claims priority from JP Application Serial Number 2021-202231, filed Dec. 14, 2021, the disclosure of which is hereby incorporated by reference herein in its entirety.

BACKGROUND

1. Technical Field

The present disclosure relates to a radiation curable ink jet composition.

2. Related Art

An ink jet recording method is a method which performs recording by ejecting small ink droplets from a fine nozzle so as to be adhered to a recording medium. The method described above has an advantage in that an image having a nigh resolution and a high quality can be recorded at a high speed by a relatively small apparatus.

In order to perform higher quality recording, the ink jet recording method has been widely studied in terms of a recording apparatus, a recording ink, a recording method, and the like. In addition, the ink has been actively developed in various application fields, and for example, development of a radiation curable ink has also been carried out.

Although the radiation curable ink jet composition is significantly useful since being a curable type, unintentional curing and generation of foreign materials are important to be taken into consideration. For example, in order to improve a storage stability, JP-A-2012-167246 has disclosed an ultraviolet curable ink jet ink composition containing a hindered amine compound.

The hindered amine compound used in JP-A-2012-167246 has the following structure.

[Chem. 1]

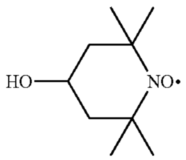

The hindered amine compound having the structure as described above inhibits an unfavorable polymerization by trapping a radical with a nitroxy group, so that the storage stability of the ink is improved. In addition, this hindered amine compound has a hydroxy group located at a para position with respect to the nitroxy radical. Accordingly, the molecule of the hindered amine compound has a water solubility. Hence, when moisture is mixed in a storage environment of an ultraviolet curable ink jet ink composition, the ink jet ink composition is dissolved in the moisture and is liable to react.

Furthermore, when the ultraviolet curable ink jet ink composition has acidity as a whole, the nitroxy radical of the hindered amine compound traps a proton and is changed into a compound having the following structure.

[Chem. 2]

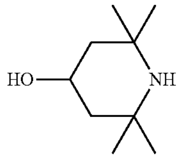

When the nitroxy radical of the hindered amine compound is changed into the above secondary amine, for example, this compound may be precipitated as foreign materials, and/or the viscosity of the ink jet ink composition may be increased in some cases. In the case described above, an ejection stability of the ultraviolet curable ink jet ink composition may be unfavorably degraded in ink jet recording in some cases.

From the mechanism as described above, a radiation curable ink jet composition which can be stably ejected even in an environment in which moisture is mixed has been desired.

SUMMARY

According to an aspect of the present disclosure, there is provided a radiation curable ink jet composition comprising: a dispersant; a polymerizable compound; and a hindered amine compound represented by the following general formula (1) or (2), the radiation curable ink jet composition has a viscosity of 50 mPa·s or less at 25° C., and the dispersant has an acid value of 30 mgKOH/g or more,

[Chem. 3]

(1)

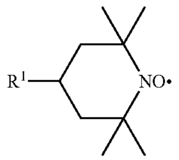

In the formula (1), $R^1$ represents H—, O═, or $R^2$—COO—, and $R^2$ represents an alkyl group having 1 to 6 carbon atoms or a substituted or unsubstituted aromatic ring.

[Chem. 4]

(2)

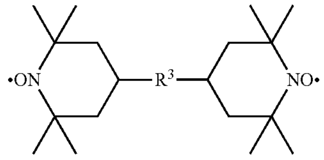

In the formula (2), $R^3$ represents —OCO—$R^4$—COO—, and $R^4$ represents an alkyl group having 1 to 12 carbon atoms.

DESCRIPTION OF EXEMPLARY EMBODIMENTS

Hereinafter, embodiments of the present disclosure will be described. The following embodiments are described to explain examples of the present disclosure. The present disclosure is not at all limited to the following embodiments and includes variously changed and/or modified embodiments to be performed without departing from the scope thereof. In addition, all structures described below are not required to be essential structures of the present disclosure.

1. Radiation Curable Ink Jet Composition

A radiation curable ink jet composition according to this embodiment contains a dispersant, a polymerizable compound, and a hindered amine compound represented by the following general formula (1) or (2).

[Chem. 5]

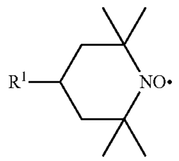

(1)

In the formula (1), $R^1$ represents H—, O═, or $R^2$—COO—, and $R^2$ represents an alkyl group having 1 to 6 carbon atoms or a substituted or unsubstituted aromatic ring.

[Chem. 6]

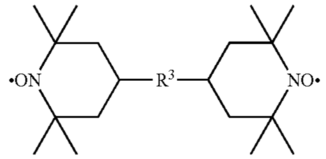

(2)

In the formula (2), $R^3$ represents —OCO—$R^4$—COO—, and $R^4$ represents an alkyl group having 1 to 12 carbon atoms.

In addition, the radiation curable ink jet composition has a viscosity of 50 mPa·s or less at 25° C. and the dispersant has an acid value of 30 mgKOH/g or more. Hereinafter, the components of the radiation curable ink jet composition will be described,

1.1. Dispersant

The radiation curable ink jet composition contains a dispersant. When the radiation curable ink jet composition contains a pigment and/or at least one another dispersion component, the dispersant has a function to further improve a dispersibility thereof. The dispersant may be used alone, or at least two types thereof may be used in combination.

As the dispersant, a dispersant having an acid value of 30 mgKOH/g or more is used. As the dispersant, for example, the type thereof is not particularly limited as long as the acid value is in the range described above. As the type of dispersant, for example, a dispersant, such as a high molecular weight dispersant, which is generally used for preparation of a pigment dispersion liquid may be mentioned. As a concrete example thereof, at least one selected from a polyoxyalkylene, a polyalkylene polyamine, a vinyl-based polymer, a copolymer thereof, an acrylic-based polymer, a copolymer thereof, a polyester, a polyamide, a polyimide, a polyurethane, an amino-based polymer, a silicon-containing polymer, a sulfur-containing polymer, a fluorine-containing polymer, and an epoxy resin may be used.

As a commercially available product of the high molecular weight dispersant, for example, there may be mentioned AJISPER series manufactured by Ajinomoto Fine-Techno Co., Inc.; Solsperse series (such as Solsperse 36000) available from Avecia and Noveon; DISPER BYK series manufactured by BYK Additives & Instruments; or DISPARLON series manufactured by Kusumoto Chemicals, Ltd. In the radiation curable ink jet composition of this embodiment, among those commercially available products, a dispersant having an acid value of 30 mgKOH/g or more may be used.

When the acid value of the dispersant is 30 mgKOH/g or more, the dispersant is dissolved in moisture and has acidity depending on an environment in which the radiation curable ink jet composition is placed, and when a hindered amine compound having a hydrophilic group is present therewith, the function thereof may be inhibited in some cases. However, since the radiation curable ink jet composition of this embodiment contains a hindered amine compound which will be described below, even when the acid value of the dispersant is 30 mgKOH/q or more, a function, such as a radical trapping function, as a polymerization inhibitor can be stably maintained. When the acid value of the dispersant is 40 mgKOH/g or more and further 50 mgKOH/g or more, an effect to improve the storage stability and the ejection stability of the radiation curable ink jet composition of this embodiment can be significantly obtained.

A content of the dispersant with respect to a total mass of the composition is preferably 0.5 to 10 percent by mass and more preferably 1.0 to 5.0 percent by mass.

1.2. Polymerizable Compound

The radiation curable ink jet composition of this embodiment contains a polymerizable compound. As the polymerizable compound, for example, there may be mentioned a compound represented by the following general formula (3), an alicyclic monofunctional (meth)acrylate, a monofunctional (meth)acrylate having a cyclic ether structure, an urethane (meth)acrylate, and other polymerizable compounds.

In addition, in this specification, "(meth)acrylate" Indicates at least one of acrylate and methacrylate, and "(meth) acrylic" indicates at least one of acrylic and methacrylic.

1.2.1. Compound Represented by General Formula (3)

The compound represented by the following general formula (3) may also be called a vinyl group-containing (meth)acrylate. That is, the compound represented by the general formula (3) is a vinyl ether group-containing bifunctional (meth)acrylate having a double bond of a (meth) acrylic group and a double bond of a vinyl ether group.

$$H_2C{=}CR^5{—}CO{—}OR^6{—}O{—}CH{=}CH{—}R^7 \quad (3)$$

In the general formula (3), $R^5$ represents a hydrogen atom or a methyl group, $R^6$ represents a divalent organic residue having 2 to 20 carbon atoms, and $R^7$ represents a hydrogen atom or a monovalent organic residue having 1 to 11 carbon atoms.

Hereinafter, the vinyl ether group-containing (meth)acrylate represented by the general formula (3) may be simply described as the "compound of the formula (3)" in some cases.

Since the radiation curable ink jet composition according to this embodiment contains the compound of the formula (3), a curing property of the radiation curable ink jet composition can be made more excellent. In addition, since the compound of the formula (3) is contained, the viscosity of the composition can be easily suppressed to be low. Furthermore, compared to the case in which a compound having a vinyl ether group and a compound having a (meth)acrylic group are both individually used, the compound having a vinyl ether group and a (meth)acrylic group in one molecule is more preferably used since the curing property of the radiation curable ink jet composition can be made more excellent. Furthermore, when the vinyl ether group-containing (meth)acrylate represented by the general formula (3) is used, the ejection stability of the ink composition from a nozzle can be further improved in ink jet recording.

In the above general formula (3), as the divalent organic residue having 2 to 20 carbon atoms represented by $R^6$, a linear, branched, or cyclic substituted or unsubstituted alkylene group having 2 to 20 carbon atoms, a substituted or unsubstituted alkylene group having 2 to 20 carbon atoms and an oxygen atom derived from an ether bond and/or an ester bond in the structure, or a substituted or unsubstituted divalent aromatic group having 6 to 11 carbon atoms is preferable. Among those mentioned above, an alkylene group, such as an ethylene group, an n-propylene group, an isopropylene group, or a butylene group, having 2 to 6 carbon atoms or an alkylene group, such as an oxyethylene group, an oxy-n-propylene group, an oxyisopropylene group, or an oxybutylene group, having 2 to 9 carbon atoms and an oxygen atom derived from an ether bond in the structure is preferably used. Furthermore, in order to further decrease the viscosity of the radiation curable ink jet composition and to further improve the curing property thereof, a compound having a glycol ether chain in which $R^6$ represents an alkylene group, such as an oxyethylene group, an oxy-n-propylene group, an oxyisopropylene group, or an oxybutylene group, having 2 to 9 carbon atoms and an oxygen atom derived from an ether bond in the structure is more preferable.

In the above general formula (3), as the monovalent organic residue having 1 to 11 carbon atoms represented by $R^7$, a linear, branched, or cyclic substituted or unsubstituted alkyl group having 1 to 10 carbon atoms or a substituted or unsubstituted aromatic group having 6 to 11 carbon atoms is preferable. Among those mentioned above, an alkyl group, such as a methyl group or an ethyl group, having 1 to 2 carbon atoms or an aromatic group, such as a phenyl group or a benzyl group, having 6 to 8 carbon atoms is preferably used.

Although a concrete example of the compound of the formula (3) is not particularly limited, for example, there may be mentioned 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth) acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexyhlmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate (VEEA), 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy) propyl (meth)acrylate, 2 (vinyloxyisopropoxyisopropoxy)propyl (meth)acrylate, 2-(vinyloxyethoxyethoxy) isopropyl (meth)acrylate, 2-(vinyloxyethoxyisopropoxy) isopropyl (meth)acrylate, 2-(vinyloxyisopropoxyethoxy)isopropyl (meth)acrylate, 2-(viryloxyisopropoxyisopropoxy) isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-isopropenoxyethoxyethoxyethoxy)ethyl (meth)acrylate, 2-(isopropenoxyethoxyethoxyethoxyethoxy)ethyl (meth) acrylate, a polyethylene glycol monovinyl ether (meth) acrylate, or a polypropylene glycol monovinyl ether (meth) acrylate. Among those concrete examples, since the curing property and the viscosity of the composition are likely to be balanced, VEEA, that is, 2-(2-vinyloxyethoxy)ethyl acrylate, is particularly preferable.

The compound represented by the general formula (3) may be used alone, or at least two types thereof may be used in combination.

When the compound of the formula (3) is used, a content thereof with respect to the total mass (100 percent by mass) of the radiation curable ink jet composition is preferably 10.0 to 40.0 percent by mass, more preferably 20.0 to 40.0 percent by mass, and further preferably 25.0 to 35.0 percent by mass. When the content of the compound of the formula (3) is in the range described above, the curing property of the radiation curable ink jet composition can be made sufficient, and the viscosity thereof can also be suppressed to be low. In addition, the compound of the formula (3) may also be mixed as a dispersion medium of a pigment dispersion liquid which is used as a raw material, and the content described above indicates the total amount of the compound of the formula (3) contained in the radiation curable ink jet composition, 1.2.2. Alicyclic Monofunctional (Meth)Acrylate The alicyclic monofunctional (meth)acrylate has a double bond of a (meth)acrylic group and is a compound, such as cyclohexane, norbornene, or norbornadiene, having an alicyclic structure.

The alicyclic monofunctional (meth)acrylate may have a cross-linked structure. Since the alicyclic monofunctional (meth)acrylate has an alicyclic structure, a glass transition temperature of a cured material of the radiation curable ink jet composition can be adjusted. Since the radiation curable ink jet composition contains an alicyclic monofunctional (meth)acrylate as a monomer, an abrasion resistance of the cured material is improved.

As a concrete example of the alicyclic monofunctional (meth)acrylate, for example, there may be mentioned isobornyl acrylate (IBXA), isobornyl methacrylate, trimethylcyclohexyl methacrylate, or trimethylcyclohexyl acrylate (TMCHA). Among those mentioned above, isobornyl (meth)acrylate or trimethyl cyclohexyl (meth)acrylate is more preferable, and isobornyl acrylate (IBXA) or trimethylcyclohexyl acrylate (TMCHA) is further preferable.

The alicyclic monofunctional (meth)acrylate may be used alone, or at least two types thereof may be used in combination.

1.2.3. Monofunctional (Meth)Acrylate Having Cyclic Ether Structure

The monofunctional (meth)acrylate having a cyclic ether structure has a double bond of a (meth)acrylic group and is a compound, such as tetrahydrofuran or tetrahydropyran, having a cyclic ether structure. The radiation curable ink jet composition of this embodiment contains a monofunctional meth)acrylate having a cyclic ether structure at a content of 10.0 to 30.0 percent by mass.

The monofunctional (meth)acrylate having a cyclic ether structure is able to adjust the glass transition temperature of the cured material of the radiation curable ink jet composition. As the glass transition temperature is decreased, a flexibility of the cured material is increased. The monofunctional (meth)acrylate having a cyclic ether structure also has an effect to improve the adhesion by enhancing a stretching property of the cured material.

Although the monofunctional (meth)acrylate having a cyclic ether structure is not particularly limited, for example, at least one selected from cyclic trimethylolpropane formal acrylate (CTFA), cyclic trimethylolpropane formal methacrylate, tetrahydrofurfuryl acrylate (THFA), and tetrahydrofurfuryl methacrylate is preferably used. As a more preferable example of the monofunctional (meth)acrylate having a cyclic ether structure, cyclic trimethylolpropane formal acrylate (CTFA) or cyclic trimethylolpropane formal methacrylate may be mentioned.

The monofunctional (meth)acrylate having a cyclic ether structure may be used alone, or at least two types thereof may be used in combination.

1.2.4. Urethane (Meth)Acrylate

The urethane (meth)acrylate has a double bond of a (meth)acrylic group and is a compound having an urethane bond. The radiation curable ink jet composition of this embodiment may contain an urethane (meth)acrylate.

A (meth)acrylate having an urethane bond is not particularly limited, and for example, although a monofunctional or a polyfunctional compound may be used, a monofunctional urethane (meth)acrylate is preferable since the viscosity of the ink can be decreased, and a monofunctional compound represented by the following general formula (44) is particularly preferable. The compound represented by the following general formula (4) is a monofunctional urethane (meth)acrylate having a double bond of a (meth)acrylic group and at least one urethane bond. The compound of the formula (4) may also be called an urethane bond-containing monofunctional (meth)acrylate.

$$H_2C{=}CR^8{-}CO{-}O{-}(R^9{-}O{-}(CO){-}(NH))_n{-}R^{10} \quad (4)$$

In the formula (4), $R^8$ represents a hydrogen atom or a methyl group, $R^9$ represents a divalent organic residue, and $R^{10}$ represents an alkyl group having 1 to 10 carbon atoms or a hydroxyalkyl group having 1 to 10 carbon atoms. In addition, n represents an integer of 1 or more.

Hereinafter, the monofunctional urethane (meth)acrylate represented by the general formula (4) is simply described as the "compound of the formula (4)" in some cases.

When the radiation curable ink jet composition according to this embodiment contains the compound of the formula (4), for example, the adhesion of the cured material of the radiation curable ink jet composition to a recording medium can be made more excellent. In addition, since the compound of the formula (4) is contained, for example, the viscosity of the composition can be suppressed to be low, and the storage stability thereof can also be made preferable.

In the compound of the formula (4), the divalent organic residue represented by $R^9$ is preferably an alkylene group, such as an ethylene group, an n-propylene group, an isopropylene group, or a butylene group, having 2 to 4 carbon atoms; the alkyl group having 1 to 10 carbon atoms or the hydroxyalkyl group having 1 to 10 carbon atoms represented by $R^{10}$ is more preferably an alkyl group having 1 to 6 carbon atoms or a hydroxyalkyl group having 1 to 6 carbon atoms, respectively; and n is more preferably 1 to 5.

In addition, in the compound represented by the general formula (4), when $R^{10}$ represents an alkyl group having 1 to 10 carbon atoms, this group is a linear, branched, or cyclic alkyl group having 1 to 10 carbon atoms. In addition, when $R^{10}$ represents a hydroxyalkyl group having 1 to 10 carbon atoms, this group is a group in which at least one hydrogen atom bonded to at least one carbon atom of a linear, branched, or cyclic alkyl group having 1 to 10 carbon atoms is replaced by at least one hydroxy group.

As an example of $R^{10}$, for example, there may be mentioned a methyl group, an ethyl group, an n-propyl group, an isopropyl group, an n-butyl group, a t-butyl group, a butyl group, a pentyl group, a hexyl group, a heptyl group, an octyl group, a nonyl group, a decyl group, a structural isomer group thereof, or a group mentioned above having a cyclo ring, a bicyclo ring, and/or a spiro ring. In addition, as an example of $R^{10}$, a group in which at least one hydrogen atom bonded to at least one carbon atom of the group mentioned above is replaced by at least one hydroxy group may be mentioned.

Since the flexibility of the cured material and the adhesion thereof to a recording medium are improved, and the compound of the formula (4) is easily available or manufactured, as $R^{10}$, for example, there may be mentioned a methyl group, an ethyl group, an n-propyl group, or an isopropyl group; a linear or branched butyl group, pentyl group, hexyl group, heptyl group, octyl group, nonyl group, or decyl group; or a group in which a hydrogen atom bonded to a terminal carbon atom of the group mentioned above is replaced by a hydroxy group.

Although the compound represented by the general formula (4) is not particularly limited to those mentioned below, for example, there may be mentioned a compound obtained by a reaction between a hydroxyalkyl (meth) acrylate and an alkyl monoisocyanate or a compound obtained by a reaction between a hydroxyalkyl (meth) acrylate and a hydroxyalkyl monoisocyanate. As a concrete example, for example, 2-(butylcarbamoyloxy)ethyl acrylate, 2-(butylcarbamoyloxy)ethyl methacrylate, 2-(hexylcarbamoyloxy)ethyl (meth)acrylate, 2-(butylcarbamoyloxy)propyl (meth)acrylate, or 2-(2-(butylcarbamoyloxy)ethyl) carbamoyloxy)ethyl (meth)acrylate may be mentioned. Among those mentioned above, since the balance between the viscosity of the composition, the storage stability thereof, and the adhesion of the cured material is likely to be obtained, 2-(butylcarbamoyloxy)ethyl acrylate is particularly preferable.

In addition, when the polyfunctional urethane (meth) acrylate is used, a bifunctional urethane (meth)acrylate is preferably used. Since the bifunctional urethane (meth) acrylate tends to increase the viscosity of the composition, a relative small amount thereof is preferably used. As the bifunctional urethane (meth)acrylate, for example, CN9893 (urethane-based monomer, manufactured by Sartomer) may be mentioned.

The urethane (meth)acrylate may be used alone, or at least two types thereof may be used in combination.

1.2.5. Other Polymerizable Compounds

The radiation curable ink jet composition of this embodiment may contain di(meth)acrylate monomer. The di(meth) acylate monomer is a bifunctional monomer.

Although the di(meth)acrylate monomer is not particularly limited, for example, there may be mentioned tripropylene glycol diacrylate (TPGDA), tripropylene glycol di(meth)acrylate, triethylene glycol di(meth)acrylate, dipropylene glycol diacrylate (DPGDA), diethylene glycol di(meth)acrylate, tetraethylene glycol di(meth)acrylate, a polyethylene glycol di(meth)acrylate, dipropylene glycol dimethacrylate, a polypropylene glycol di(meth)acrylate, 1,4-butanediol di(meth)acrylate, 1,6-hexanediol di(meth) acrylate, 1,9-nonanediol di(meth)acrylate, neopentyl glycol diacrylate (NPGDA) or its PO modified product (NPGDA (PO)), neopentyl glycol dimethacrylate, dimethylol tricyclodecane di(meth)acrylate, an EO (ethylene oxide) adduct di(meth)acrylate of bisphenol A, a PO (propylene oxide) adduct di(meth)acrylate of bisphenol A, hydroxypivalic acid neopentyl glycol di(meth)acrylate, or a polytetramethylene glycol di(meth)acrylate.

The di(meth)acrylate monomer may be used alone, or at least two types thereof may be used in combination.

The radiation curable ink jet composition of this embodiment may contain a polymerizable monomer having a nitrogen atom in its cyclic skeleton.

Although the polymerizable monomer having a nitrogen atom in its cyclic skeleton is not particularly limited, for example, a nitrogen-containing monofunctional vinyl monomer, such as N-vinylcaprolactam, N-vinylcarbazole, or N-vinylpyrrolidone, or a nitrogen-containing monofunctional acrylate monomer, such as acryloylmorpholine, may be mentioned.

Among those mentioned above, a nitrogen-containing monofunctional vinyl monomer or a nitrogen-containing monofunctional acrylate monomer is preferably contained, a monomer having a nitrogen-containing heterocyclic structure, such as N-vinylcaprolactam (n-VC), N-vinylcarbazole, N-vinylpyrrolidone, or acryloylmorpholine (ACMO) is more preferable, and at least one selected from N-vinylcaprolactam and acryloylmorpholine is further preferable.

Since the polymerizable monomer containing a nitrogen atom in its cyclic skeleton is used, the adhesion of the cured material of the radiation curable ink jet composition to a recording medium tends to be further improved. In addition, when the polymerizable monomer containing a nitrogen atom in its cyclic skeleton is used, the abrasion resistance of the cured material of the radiation curable ink jet composition tends to be improved.

The polymerizable monomer containing a nitrogen atom in its cyclic skeleton may be used alone, or at least two types thereof may be used in combination.

The radiation curable ink jet composition of this embodiment may contain the following monofunctional monomer and/or at least trifunctional monomer.

Although the monofunctional monomer is not particularly limited, for example, there may be mentioned phenoxyethyl (meth)acrylate (PEA), benzyl (meth)acrylate, an alkoxylated 2-phenoxyehtyl (meth)acrylate, ethoxylated nonylphenyl (meth)acrylate, an alkoxylated nonylphenyl (meth)acrylate, a p-cumylphenol EO-modified (meth)acrylate, 2-hydroxy-3-phenoxypropyl (meth)acrylate, tert-butyl cyclohexanol acrylate (TBCHA), 2-(meth)acrylic acid-1,4-dioxaspiro[4, 5]deci-2-ylmethyl, isoamyl (meth)acrylate, stearyl (meth) acrylate, lauryl (meth)acrylate, octyl (meth)acrylate, decyl (meth)acrylate, isodecyl (meth)acrylate, isomyristyl (meth) acrylate, isostearyl (meth)acrylate, 2-hydroxybutyl (meth) acrylate, 4-hydroxybutyl (meth)acrylate (4-HBA), butoxyethyl (meth)acrylate, or 2-hydroxyethyl (meth)acrylate.

Although the at least trifunctional (meth)acrylate is not particularly limited, for example, there may be mentioned trimethylolpropane tri(meth)acrylate, an EO-modified trimethylolpropane tri((meth)acrylate, pentaerythritol tri (meth) acrylate, pentaerythritol tetra(meth)acrylate, dipentaerythritol hexa(meth)acrylate, ditrimethylolpropane tetra(meth) acrylate, glycerin propoxy tri(meth)acrylate, caprolactone-modified trimethylolpropane tri (meth)acrylate, pentaerythritol ethoxy tetra(meth)acrylate, a dipentaerythritol polyacrylate (A-DPH), or caprolactam-modified dipentaerythritol hexa(meth)acrylate.

A total content of the polymerizable compound in the radiation curable ink jet composition with respect to the total mass of the composition is preferably 50 to 98 percent by mass, more preferably 60 to 95 percent by mass, even more preferably 65 to 90 percent by mass, and further preferably 70 to 80 percent by mass.

1.3. Hindered Amine Compound Represented by General Formula (1) or (2)

The radiation curable ink jet composition contains a hindered amine compound represented by the following general formula (1) or (2).

[Chem. 7]

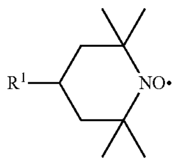

(1)

In the formula (1), $R^1$ represents H—, O═, or $R^2$—COO—, and $R^2$ represents an alkyl group having 1 to 6 carbon atoms or a substituted or unsubstituted aromatic ring.

[Chem. 8]

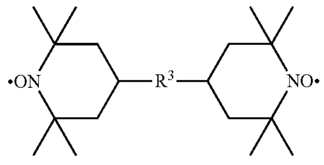

(2)

In the formula (2), $R^3$ represents —OCO—$R^4$—COO—, and $R^4$ represents an alkyl group having 1 to 12 carbon atoms.

The hindered amine compound represented by the general formula (1) or (2) has no hydrophilic groups. That is, the hindered amine compound has a hydrophobic property. Hence, the protonation of the nitroxy radical is suppressed, and even when moisture is mixed in the ink, the storage stability of the ink can be preferably maintained.

The hindered amine compound represented by the general formula (1) or (2) preferably has a molecular weight of 250 or more. When the molecular weight of the hindered amine compound is 250 or more, the water solubility of the hindered amine compound is further decreased. Accordingly, the radiation curable ink jet composition can be made more unlikely to generate foreign materials.

In addition, the hindered amine compound is more preferably a compound represented by the above general formula (2). When being a compound represented by the above general formula (2), the hindered amine compound has a dimer structure, and hence, the water solubility of the hindered amine compound can be even further decreased. Accordingly, the radiation curable ink jet composition can be made more unlikely to generate foreign materials.

An upper limit of a content of the hindered amine compound in the radiation curable ink jet composition with respect to the total mass thereof is 1.5 percent by mass or less, preferably 1.0 percent by mass or less, more preferably 0.5 percent by mass or less, and further preferably 0.3 percent by mass or less. In addition, a lower limit of the content of the hindered amine compound in the radiation curable ink jet composition with respect to the total mass thereof is 0.02 percent by mass or more, preferably 0.05 percent by mass or more, and further preferably 0.08 percent by mass or more.

When the content of the hindered amine compound is as described above, since the concentration thereof is low, the generation of foreign materials derived from the hindered amine compound is suppressed, and discoloration of a coating film caused by the hindered amine compound can also be suppressed.

1.4. Pigment

The radiation curable ink jet composition may contain a pigment. The pigment may be dispersed by the dispersant described above. In addition, the pigment may be supplied in the form of a pigment dispersion liquid. When the pigment is used, a weather resistance of the coating film of the radiation curable ink jet composition can be made preferable. As the pigment, both an inorganic pigment and an organic pigment may be used.

As the inorganic pigment, a carbon black (C.I. Pigment Black 7), such as furnace black, lamp black, acetylene black, or channel black, iron oxide, or titanium oxide may be used.

As the organic pigment, for example, there may be mentioned an azo pigment, such as an insoluble azo pigment, a condensed azo pigment, an azo lake, or a chelate azo pigment; a polycyclic pigment, such as a phthalocyanine pigment, a perylene pigment, a perinone pigment, an anthraquinone pigment, a quinacridone pigment, a dioxane pigment, a thioindigo pigment, an isoindolinone pigment, or a quinophthalone pigment; a dye chelate (such as a basic dye type chelate or an acidic dye type chelate), a dye lake (such as a basic dye type lake or an acidic dye type lake), a nitro pigment, a nitroso pigment, a carbon black, an aniline black, or a daylight fluorescent pigment.

As a black pigment, for example, there may be mentioned No. 2300, No. 900, MCF88, No. 33, No. 40, No. 45, No. 52, MA7, MA8, MA100, or No. 2200B (trade name, manufactured by Mitsubishi Chemical Corporation); Raven 5750, Raven 5250, Raven 5000, Raven 3500, Raven 1255, or Raven 700 (trade name, manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, or Monarch 1400 (trade name, manufactured by Cabot Japan K. K.) or Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, or Special Black 4 (trade name, manufactured by Degussa).

As a white pigment, for example, there may be mentioned C.I. Pigment White 6, 18, or 21, a metal oxide, or a metal compound, such as barium sulfate or calcium carbonate. As the metal oxide, for example, titanium oxide, zinc oxide, silica, alumina, or magnesium oxide may be mentioned.

As a yellow pigment, for example, there may be mentioned C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, or 180.

As a magenta pigment, for example, there may be mentioned C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, or 245, or C.I. Pigment Violet 19, 23, 32, 33, 36, 38, 43, or 50.

As a cyan pigment, for example, there may be mentioned C.I. Pigment Blue 1, 2, 3, 15, 15:1, 15:2, 15:3, 15:34, 15:4, 16, 18, 22, 25, 60, 65, or 66, or C.I. Vat Blue 4 or 60.

In addition, as a color pigment other than the magenta, cyan, and yellow, for example, there may be mentioned C.I. Pigment Green 7 or 10, C.I. Pigment Brown 3, 5, 25, or 26, or C.I. Pigment Orange 1, 2, 5, 7, 13, 14, 15, 16, 24, 34, 36, 38, 40, 43, or 63.

The pigments mentioned above may be used alone, or at least two types thereof may be used in combination.

When the radiation curable ink jet composition contains a pigment, a content thereof with respect to the total mass of the radiation curable ink jet composition is 0.1 to 10 percent by mass, preferably 0.5 to 5 percent by mass, more preferably 1.0 to 5.0 percent by mass, and further preferably 1.5 to 3.0 percent by mass.

1.5. Polymerization Initiator

The radiation curable ink jet composition may contain a polymerization initiator. The polymerization initiator has a function to cure the ink by polymerization performed by emission of radiation rays, such as ultraviolet rays or visible light rays. Since ultraviolet rays (UV) are used, the safety is excellent, and a cost of a light source lamp can be reduced. As the polymerization initiator, although a compound which generates active species, such as radicals or cations, by energy of the radiation rays and which starts the polymerization of the monomer may be used without any restriction, a radical polymerization initiator or a cation polymerization initiator may be used, and in particular, a radical polymerization initiator is preferably used.

As the radical polymerization initiator, for example, there may be mentioned an aromatic ketone, an acylphosphine oxide-based compound, an α-aminoalkylphenone-based compound, an aromatic onium salt compound, an organic peroxide, a thio compound (such as a thioxanthone-based compound or a thiophenyl group-containing compound), a hexaaryl biimidazole compound, a ketoxime ester compound, a borate compound, an azinium compound, a metallocene compound, an active ester compound, a compound having a carbon-halogen bond, or an alkylamine compound.

Among those mentioned above, since the curing property of the radiation curable ink jet composition can be made particularly preferable, at least one of an acylphosphine oxide-based compound, an α-aminoalkylphenone-based compound, and a thioxanthone-based compound is preferable.

As a concrete example of the radical polymerization initiator, for example, there may be mentioned acetophenone, acetophenone benzyl ketal, 1-hydroxycyclohexyl phenyl ketone, 2,2-dimethoxy-2-phenylacetone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Miichler's ketone, benzoin propyl ether, benzoin ethyl ether, benzyl dimethyl ketal, 1-(4-isopropylphenyl)-2-hydroxy-2-methylpropane-1-one, 2-hydroxy-2-methyl-1-phenylpropane-1-one, thioxanthone, diethyl thioxanthone, 2-isopropyl thioxanthone, 2-chlorothioxanthone, 2-methyl-1-[4-(methylthio)phenyl]-2-morpholino-propane-1-one, bis(2,4,6-trimethylbenzoyl)-phenyl phosphine oxide, 2,4,6-trimethylbenzoyl-diphenyl-phosphine oxide, 2,4-diethyl thioxanthone, or bis(2,6-dimethoxybenzoyl)-2,4,4-trimethylpentyl phosphine oxide.

Among those mentioned above, at least one selected from 1-hydroxycyclohexyl phenyl ketone, 2,4,6-trimethylbenzoyl-diphenyl-phosphine oxide, bis(2,4,6-trimethylbenzoyl)-phenyl phosphine oxide, and 2,4-diethyl thioxanthone is preferably used, and at least 2,4-diethyl thioxanthone is preferably contained.

As a commercially available product of the radical polymerization initiator, for example, there may be mentioned Omnirad 651 (2,2-dimethoxy-1,2-diphenylethane-1-one, Omnirad 184 (1-hydroxy-cyclohexyl-phenyl-ketone), DAROCUR 1173 (2-hydroxy-2-methyl-1-phenyl-propane-1-one), Omnirad 2959 (1-[4-(2-hydroxyethoxy)-phenyl]-2-hydroxy-2-methyl-1-propane-1-one), Omnirad 127 (2-hydroxy-1-{4-[4-(2-hydroxy-2-methyl-propionyl)-benzyl] phenyl}-2-methyl-propane-1-one), Omnirad 907 (2-methyl-1-(4-methylthiophenyl)-2-morpholinopropane-1-one), Omnirad 369 (2-benzyl-2-dimethylamino-1-(4-morpholinophenyl)-butanone-1), Omnirad 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), Omnirad 819 (bis(2,4,6-trimethylbenzoyl)-phenyl phosphine oxide), Omnirad TPO (2,4,6-trimethylbenzoyl-diphenyl-phosphine oxide), Omnirad 784 (bis(η5-2,4-cyclopentadien-1-yl)-bis(2,6-difluoro-3-(1H-pyrrol-1-yl)-phenyl)titanium), Omnirad OXE 01 (1,2-Octanedione, 1-[4-(phenylthio)-, 2-(O-benzoyloxime)]), Omnirad OXE 02 (ethanone, 1-[9-ethyl-6-(2-methylbenzoyl)-9H-carbazol-3-yl]-, 1-(O-acetyloxime)), or Omnirad 754 (mixture of oxy-phenyl-acetic acid 2-[2-oxo-2-phenyl-acetoxyethoxy]ethyl ester, and oxy-phenyl-acetic acid 2-(2-hydroxyethoxy)ethyl ester) (trade name, manufactured by BASF); KAYACURE DETX-S (trade name, 2,4-diethylthioxanthone, manufactured by Nippon Kayaku Co., Ltd.); Lucirin TPO, LR8893 or LR8970 (trade name, manufactured by BASF); or Ebecryl P36 (manufactured by UCB).

The polymerization initiators mentioned above may be used alone, or at least two types thereof may be used in combination. In addition, when the thioxanthone-based polymerization initiator is also used as a sensitizer, a content thereof is preferably 0.1 to 0.5 percent by mass when the total mass of the composition is assumed to be 100 percent by mass. In the case in which the thioxanthone-based polymerization initiator is also used as the sensitizer, when the content thereof is in the range described above, an effect as the sensitizer can be expected.

1.6. Other Components 1.6. Slipping Agent

The radiation curable ink jet composition according to this embodiment may further contain a slipping agent. The slipping agent is a surfactant and may be used alone, or at least two types thereof may be used in combination.

As the slipping agent, a silicone-based surfactant is preferable, and a polyester modified silicone or a polyether modified silicone is more preferable. As the polyether modified silicone, for example, BYK-378 or 3455, or BYK-UV3500, 3510, or 3530 (manufactured by BYK Additives & Instruments) may be mentioned, and as the polyester modified silicone, for example, BYK-3570 (manufactured by BYK Additives & Instruments) may be mentioned.

A content of the slipping agent with respect to the total mass of the composition is preferably 0.1 to 1.0 percent by mass and more preferably 0.3 to 0.8 percent by mass.

1.6.2. Sensitizer

The radiation curable ink jet composition may further contain a sensitizer. As a photosensitizer, for example, there may be mentioned an amine compound (such as an aliphatic amine, an amine having an aromatic group, piperidine, a reaction product between an epoxy resin and an amine, or triethanolamine triacrylate), an urea compound (such as an allylthiourea, or o-tolylthiourea), a sulfur compound (such as sodium diethyl dithiophospaate or a soluble salt of an aromatic sulfinic acid), a nitrile-based compound (such as N,N-diethyl-p-aminobenzonitrile), a phosphorus compound (such as tri-n-butyl phosphine or sodium diethyl dithiophosphide), a nitrogen compound (such as Micher's ketone, an N-nitroso hydroxylamine derivative, an oxazolidine compound, a tetrahydro-1,3-oxadine compound, or a condensate between a diamine and formaldehyde or acetaldehyde), or a chloride compound (such as carbon tetrachloride or hexachloroethane).

When the photosensitizer is used, a content thereof with respect to the total mass of the composition is preferably 0.01 to 1.0 percent by mass and more preferably 0.1 to 0.5 percent by mass.

1.6.3. Fluorescent Brighter

The radiation curable ink jet composition may contain a fluorescent brighter. The fluorescent brighter is able to absorb light having a wavelength of approximately 300 to 450 nm which is a range from UV to visible short wave and is a colorless or weakly-colored compound which is able to emit light having a wavelength of approximately 400 to 500 nm. The fluorescent brighter is also known as a fluorescent whitening agent. Physical principles and chemical characteristics of the fluorescent brighter have been described in Ullmana's Encyclopedia of industrial Chemistry, Sixth Edition, Electronic Release, Wiley-VCH 1998.

Since the radiation curable ink jet composition contains a fluorescent brighter, yellowing of the cured material may be suppressed in some cases. In addition, since the fluorescent brighter is contained, the curing property of the composition can be made more excellent, and in addition, the degree of whiteness of the cured material can be improved in some cases. In addition, the yellowing of the cured material may be confirmed, for example, by a commonly used colorimeter or the like.

Although the fluorescent brighter is not particularly limited, for example, there may be mentioned a naphthalene benzoxazolyl derivative, such as 1,4-bis-(2-benzoxazoyl) naphthalene, a thiophene benzoxazolyl derivative, such as 2,5-thiophene diylbis(5-tert-butyl-1,3-benzoxazole), a stilbene benzoxazolyl derivative, a coumarin derivative, a styrene biphenyl derivative, a pyrazolone derivative, a stilbene derivative, a styryl derivative of benzene or biphenyl, a bis(benzazole-2-yl) derivative, carbostyril, naphthalimide, a derivative of dibenzothiophene-5,5'-dioxide, a pyrene derivative, or a pyridothiazole.

As a commercially available product of the fluorescent brighter, for example, there may be mentioned Telalux OB, Telalux KCB, Telalux KS, or Telalux KS-N (manufactured by Clariant Japan K.K.) or Tinopal OB-CO or Tinopal NFW LIQ (manufactured by BASF).

When the fluorescent brighter is used, a content thereof with respect to the total mass of the composition is preferably 0.01 to 1.0 percent by mass and more preferably 0.07 to 0.70 percent by mass.

1.7. Physical Properties

The viscosity of the radiation curable ink jet composition according to this embodiment at 25° C. is 50 mPa-s or less. The viscosity of the radiation curable ink jet composition at 25° C. is preferably 45 mPa·s or less and more preferably 40 mPa·s or less. Since the viscosity of the composition at 25° C. is in the range described above, an appropriate amount of the composition is ejected from a nozzle, and flight bending and scattering of the composition can be further suppressed; hence, the radiation curable ink jet composition described above can be preferably used in an ink jet recording apparatus. In particular, the composition described above can be preferably used for ejection from a piezoelectric type ink jet head which ejects an ink at ordinary temperature. Furthermore, since the dispersant and the hindered amine compound are used in combination as described in the present disclosure, even when the composition is used in an environment in which moisture is mixed, the viscosity thereof at 25° C. can be maintained at a low level as in the viscosity range described above. In addition, in order to maintain the viscosity of the radiation curable ink jet composition at 25° C. in the range described above, a gelation agent, such as a wax, is preferably contained at a content of less than 0.1 percent by mass with respect to the total mass of the radiation curable ink jet composition and is more preferably not contained.

In addition, the viscosity can be measured using an viscoelasticity tester MCR-300 (manufactured by Pysica) such that in an environment at 20° C., a shear rate is increased from 10 to 1,000, and a viscosity at a shear rate of 200 is read.

A surface tension of the radiation curable ink jet composition according to this embodiment at 20° C. is preferably 20 to 40 mN/m. When the surface tension of the radiation curable ink jet composition at 20° C. is in the range described above, the composition is not likely to wet a nozzle surface which is processed by a liquid repellent treatment. Accordingly, since an appropriate amount of the composition is normally ejected from the nozzle, and flight bending and scattering can be further suppressed, the radiation curable ink jet composition described above can be preferably used in an ink jet recording apparatus. In addition, the surface tension can be measured using an automatic surface tension meter CBVP-Z (manufactured by Kyowa Interface Science Co., Ltd.) such that a surface tension at which a platinum plate is wetted with the radiation curable ink jet composition in an environment at 20° C. is confirmed.

1.8. Operational Effect

As described above, in the radiation curable ink jet composition of this embodiment, a dispersant showing acidity when being dissolved in moisture is contained. In this case, when a hindered amine compound having a hydrophilic group is contained in the radiation curable ink jet composition, if moisture is mixed in the ink, the hindered amine compound having a hydrophilic group is dissolved in this moisture, and a reaction in which a nitroxy radical present in a hindered amine skeleton is protonated by an acid occurs. As a result, for example, since the function of the polymerization initiator is degraded, and/or foreign materials are generated in the ink, the ejection stability may be degraded in some cases. However, according to this radiation curable ink jet composition, even if a component showing acidity when being dissolved in moisture is contained, since the hindered amine compound has a hydrophobic property, the nitroxy radical is not protonated, and even when moisture is mixed in the ink, the storage stability thereof can be preferably maintained.

2. Examples and Comparative Examples

Hereinafter, although the present disclosure will be described in more detail with reference to examples, the present disclosure is not Limited thereto. In addition, unless otherwise specifically noted, "%" is on a mass basis.

2.1. Preparation of Ink

An ink of each example was prepared such that components were mixed together to have one of the compositions (unit: percent by mass) shown in Table 1 and then stirred by a nigh speed water cooling stirrer. In addition, a pigment (C.I. Pigment Blue 15: 3 and titanium oxide) was prepared in the form of a dispersion liquid in which PEA was use d as a base medium, and a dispersant shown in Table 1 was added to the pigment in an amount of 50 percent by mass thereof.

TABLE 1

| | | EXAMPLE | | | | | | | | | | | COMPARATIVE EXAMPLE | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| DISPERSION LIQUID | CYAN PIGMENT | 2.5 | 2.5 | 2.5 | 2.5 | 2.5 | 2.5 | 2.5 | 2.5 | 2.5 | 2.5 | 2.6 | 2.5 | 2.5 | 2.5 | 2.5 |
| DISPERSANT | DISPERBYK-110 | 1.5 | — | | 1.5 | 1.5 | 1.5 | 1.5 | 1.5 | 1.5 | 1.5 | 1.5 | 1.6 | 1.5 | 1.5 | — |
| | DISPERBYK-118 | — | 1.5 | — | — | — | — | — | — | — | — | — | — | — | — | — |
| | Solsperze36000 | — | — | 1.5 | — | — | — | — | — | — | — | — | — | — | — | — |
| | DISPERBYK-174 | — | — | — | — | — | — | — | — | — | — | — | — | — | — | 1.5 |
| POLYMERIZABLE | PEA | 6.0 | 6.0 | 6.0 | 6.0 | 6.0 | 8.0 | 6.0 | 6.0 | 6.0 | 6.0 | 6.0 | 6.0 | 6.0 | 6.0 | 6.0 |
| COMPOUND | VEEA | 25.0 | 25.0 | 25.0 | 25.08 | 24.6 | 25.08 | 24.4 | 25.0 | 25.0 | 25.0 | — | 25.0 | 25.09 | 25.1 | 25.0 |
| | PEA | 20.0 | 20.0 | 20.0 | 20.0 | 20.0 | 20.0 | 20.0 | 15.0 | 20.0 | 20.0 | 30.0 | 20.0 | 20.0 | 20.0 | 20.0 |
| | IBXA | — | — | — | — | — | — | — | 5.0 | — | — | 5.0 | — | — | — | — |
| | DPGDA | 20.0 | 20.0 | 20.0 | 20.0 | 20.0 | 20.0 | 20.0 | 15.0 | 20.0 | 20.0 | 30.0 | 20.0 | 20.0 | 20.0 | 20.0 |
| | TPGDA | 10.0 | 10.0 | 10.0 | 10.0 | 10.0 | 10.0 | 10.0 | | 10.0 | 10.0 | 10.0 | 10.0 | 10.0 | 10.0 | 10.0 |
| | 4-HBA | — | — | — | — | — | — | — | 10.0 | — | — | — | — | — | — | — |
| | A-DPH | — | — | — | — | — | — | — | 5.0 | — | — | — | — | — | — | — |
| | ON9893 | 1.25 | 1.25 | 1.25 | 1.25 | 1.25 | 1.25 | 1.25 | 1.25 | 1.25 | 1.25 | 1.25 | 1.25 | 1.25 | 1.25 | 1.25 |

TABLE 1-continued

| | | EXAMPLE | | | | | | | | | | | COMPARATIVE EXAMPLE | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| POLYMERIZATION INITIATOR | Omnirad 819 | 5.0 | 5.0 | 5.0 | 5.0 | 5.0 | 5.0 | 5.0 | 5.0 | 5.0 | 50 | 5.0 | 5.0 | 5.0 | 5.0 | 5.0 |
| | Ommirad TPO | 5.0 | 5.0 | 5.0 | 5.0 | 5.0 | 5.0 | 5.0 | 50 | 5.0 | 50 | 5.0 | 5.0 | 5.0 | 5.0 | 5.0 |
| SENSITIZER | DETX | 3.0 | 3.0 | 3.0 | 3.0 | 3.0 | 3.0 | 3.0 | 3.0 | 3.0 | 3.0 | 30 | 3.0 | 3.0 | 3.0 | 3.0 |
| SURFACTANT | BYK-UV3500 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| POLYMERIZATION INHIBITOR | SEBACIC ACID BisTEMPO | 0.1 | 0.1 | 0.1 | 0.02 | 0.5 | 0.01 | 0.7 | 0.1 | — | — | 0.1 | — | — | — | 0.1 |
| | 4 BENZOYLOXY TEMPO | — | — | — | — | — | — | — | — | 0.1 | — | — | — | — | — | — |
| | 4-OXY TEMPO | — | — | — | — | — | — | — | — | — | 0.1 | — | — | — | — | — |
| | LA-7RD | — | — | — | — | — | — | — | — | — | — | — | 0.1 | 0.01 | — | — |
| | MEHQ | 0.15 | 0.15 | 0.15 | 0.15 | 0.15 | 0.15 | 0.15 | 0.15 | 0.15 | 0.15 | 0.15 | 0.15 | 0.15 | 0.15 | 0.15 |
| TOTAL | | 100 | 100 | 100 | 100 | 100 | 100 | 100 | 100 | 100 | 100 | 100 | 100 | 100 | 100 | 100 |
| INITIAL INK VISCOSITY | | A | A | A | A | A | A | A | A | A | A | B | A | A | A | A |
| FOREIGN MATERIALS IN LONG STORAGE | | A | A | A | A | A | A | A | A | A | A | A | D | D | A | A |
| INCREASE OF VISCOSITY IN LONG STORAGE | | A | A | A | B | A | C | A | A | A | B | A | A | C | D | D |
| COLOR TONE OF COATING FILM | | A | A | A | A | B | A | C | A | A | Å | A | A | A | A | A |

In Table 1, the components are as described below.

C.I. Pigment Blue 15: 3: Pigment

Dispersant: DISPERBYK-110, acid value: 53 (manufactured by BYK Additives & Instruments)

Dispersant: DISPERBYK-118, acid value: 36 (manufactured by BYK Additives & Instruments)

Dispersant: Solsperse 36000, acid value: 45 (manufactured by Lubrizol)

Dispersant: DISPERBYK-174, acid value: 22 (manufactured by BYK Additives & Instruments)

Polymerizable compound: PEA, phenoxyethyl acrylate

Polymerizable compound: VERA, 2-(2-vinyloxyethoxy) ethyl acrylate

Polymerizable compound: IBXA, isobornyl acrylate "alicyclic monofunctional acrylate"

Polymerizable compound: DPGDA, dipropylene glycol diacrylate

Polymerizable compound: TPGDA, tripropylene glycol diacrylate

Polymerizable compound: 4-HBA, 4-hydroxybutyl acrylate

Polymerizable compound: A-DPH, dipentaerythritol polyacrylate

Polymerizable compound: CN9893, trade name, bifunctional urethane (meth)acrylate, manufactured by Tomoe Engineering Co., Ltd.

Polymerization initiator: omnirad 819, bis(2,4,6-trimethylbenzoyl)-phenyl phosphine oxide, acylphosphine oxide-based polymerization initiator, manufactured by IGM Polymerization initiator: Omnirad TPO, 2,4,6-trimethylbenzoyl-diphenyl-phosphine oxide, manufactured by IGM Sensitizer: DETX KAYACURE DETX-S (2,4-diethylthioxanetone), manufactured by Nippon Kayaku Co., Ltd.

Surfactant: BYK-UV3500, slipping agent, manufactured by BYK Additives & Instruments Polymerization inhibitor: Sebacic acid BisTEMPO "Bis (2,2,6,6-tetramethyl-1-piperidinyloxy-4-yl) sebacate", molecular weight: 510, manufactured by Seiko Chemical Co., Ltd.

Polymerization inhibitor: 4-Benzoyloxy TEMPO "4-Benzoyloxy-2,2,6,6-tetramethylpiperidine-1-oxy", molecular weight: 276, manufactured by Seiko Chemical Co., Ltd.

Polymerization inhibitor: 4-Oxy TEMPO "4-Oxo-2,2,6,6-tetramethylpiperidine 1-oxy", molecular weight: 171, manufactured by Tokyo Chemical Industry Co., Ltd.

Polymerization inhibitor: LA-7RD, ADEKA STAB LA-7RD, molecular weight: 172, manufactured by ADEKA Corporation Polymerization inhibitor: MEHQ, p-methoxyphenol "Hydroquinone monomethyl ether", manufactured by Kanto Chemical Co., Inc.

2.2 Evaluation of Ink Jet Composition and Cured Material 2.2.1. Evaluation of Initial Viscosity The viscosity (mPa·s) of the radiation curable ink of each example was measured at 25° C. using a rotational viscometer "Rheometer" (MCR-300, manufactured by Anton Paar). Evaluation was performed by the following criteria, and the evaluation results are shown in Table 1.

Evaluation Criteria

A: less than 20 mPa·s

B: 20 mPa·s to less than 25 mPa·s

C: 25 mPa·s or more 2.2.2. Evaluation of Foreign Materials in Long Storage

After the composition was prepared and then received in an aluminum pack, this aluminum pack was stored at 70° C. for 6 days. Subsequently, the aluminum pack described above was stored in a cool box at 5° C. for 20 days. Next, 10 cc of the composition thus stored was sampled and then filtrated using a SUB filter having a pore size of 10 μm, and foreign materials on the filter were observed. The number of foreign materials in an area of 2 mm diameter was counted and then evaluated by the following criteria, and the results are shown in Table 1.

Evaluation Criteria

A: Number of foreign materials is 0 to 5.

B: Number of foreign materials is 6 to 15.

C: Number of foreign materials is 16 to 30.

D: Number of foreign materials is 31 or more.

2.2.3. Evaluation of Increase of Viscosity in Long Storage

An initial viscosity and a viscosity after storage at 70° C. for 6 days were measured at 25° C., and a viscosity increase rate of the viscosity after the storage to the initial viscosity was evaluated. The evaluation was performed by the following criteria, and the results are shown in Table 1.

Evaluation Criteria

A: viscosity change of less than 5%

B: viscosity change of 5% to less than 10%

C: viscosity change of 10% to less than 15%

D: viscosity change of 15% or more 2.2.4. Evaluation of Color Tone of Coating Film After a coating film was formed by a bar coater No. 6+D65 (wet thickness: 12 μm) and then irradiated at 400 mJ with light having a peak wavelength of 385 nm emitted from an LED, so that the composition was cured. A color tone of the coating film thus cured was evaluated by visual inspection in accordance with the following criteria, and the results are shown in Table 1.

Evaluation Criteria

A: No problems occur.

B: Yellow tone is very slightly observed.

C: Yellow tone is slightly observed.

2.3. Evaluation Result

From Examples and Comparative Examples, the following were found.

In the radiation curable ink jet composition of each Example in which the dispersant, the polymerizable compound, and the hindered amine compound represented by the general formula (1) or (2) are contained, the viscosity at 25° C. is 50 mPa·s or less, and the acid value of the dispersant is 30 mgKOH/g or more, both the number of foreign materials and the increase of viscosity in the long storage show preferable results. On the other hand, in comparative Examples 1 to 3 in which the hindered amine compound represented by the general formula (1) or (2) is not contained, the number of foreign materials or the increase of viscosity in the long storage is inferior. Furthermore, in Comparative Example 4 in which the dispersant having a low acid value is used, the viscosity was seriously increased in the long storage.

The embodiments and modified examples described above are each one example, and the present disclosure is not limited thereto. For example, the embodiments and the modified examples may be appropriately used in combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples, the following conclusions are obtained.

A radiation curable ink jet composition contains: a dispersant; a polymerizable compound; and a hindered amine compound represented by the following general formula (1) or (2), the radiation curable ink jet composition has a viscosity of 50 mPa·s or less at 25° C., and the dispersant has an acid value of 30 mgKOH/g or more.

[Chem. 9]

(1)

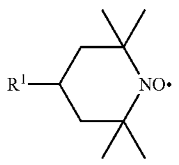

In the formula (1), $R^1$ represents H—, O=, or $R^2$—COO—, and $R^2$ represents an alkyl group having 1 to 6 carbon atoms or a substituted or unsubstituted aromatic ring.

[Chem. 10]

(2)

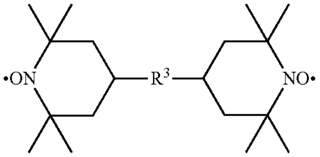

In the formula (2), $R^3$ represents —OCO—$R^4$—COO—, and $R^4$ represents an alkyl group having 1 to 12 carbon atoms.

This radiation curable ink jet composition contains a dispersant showing acidity when being dissolved in moisture. In this case, when a hindered amine compound having a hydrophilic group is contained in the radiation curable ink jet composition, if moisture is mixed in the ink, the hindered amine compound having a hydrophilic group is dissolved in the moisture, and a reaction in which the nitroxy radical present in the hindered amine skeleton is prontonated by an acid occurs. Hence, for example, since the function as the polymerization inhibitor may be degraded, and/or foreign materials may be generated in the ink, the ejection stability may be degraded in some cases. However, according to this radiation curable ink jet composition, even when a component showing acidity when being dissolved in moisture is contained, since the hindered amine compound has a hydrophobic property, the nitroxy radical is not proptonated. Accordingly, even if moisture is mixed in the ink, the function as the polymerization inhibitor is not degraded, and the storage stability can be preferably maintained.

In the radiation curable ink jet composition described above, the hindered amine compound may have a molecular weight of 250 or more.

According to this radiation curable ink let composition, since the molecular weight of the hindered amine compound is 250 or more, the water solubility of the hindered amine compound is lower. Hence, the hindered amine compound is not likely to be dissolved in moisture, and foreign materials are more unlikely to be generated in the radiation curable ink jet composition.

In the radiation curable ink jet composition described above, the hindered amine compound may be a compound represented by the above general formula (2).

According to the radiation curable ink jet composition described above, since the hindered amine compound has a dimer structure, the water solubility of the hindered amine compound is further lower. Hence, the hindered amine compound is further not likely to be dissolved in moisture, and foreign materials are further unlikely to be generated in the radiation curable ink jet composition.

In the radiation curable ink jet composition described above, a content of the hindered amine compound with respect to a total mass of the radiation curable ink jet composition may be 0.5 percent by mass or less.

According to this radiation curable ink jet composition, since the content of the hindered amine compound is low, foreign materials derived from the hindered amine compound are unlikely to be generated, and discoloration of a coating film caused by the hindered amine compound can be suppressed.

In the radiation curable ink jet composition described above, the polymerizable compound may contain a vinyl group-containing (meth)acrylate represented by the following general formula (3).

$$H_2C{=}CR^5{-}CO{-}OR^6{-}O{-}CH{=}CH{-}R^7 \quad (3)$$

In the formula (3), $R^5$ represents a hydrogen atom or a methyl group, $R^6$ represents a divalent organic residue having 2 to 20 carbon atoms, and $R^7$ represents a hydrogen atom or a monovalent organic residue having 1 to 11 carbon atoms.

According to the radiation curable ink jet composition described above, the viscosity thereof can be more easily decreased, and hence, the ejection stability from a nozzle in ink jet recording can be further improved.

What is claimed is:

1. A radiation curable ink jet composition comprising:

a dispersant;

a polymerizable compound; and a hindered amine compound represented by the following general formula (1), wherein the radiation curable ink jet composition has a viscosity of 50 mPa·s or less at 25° C., and the dispersant has an acid value of 30 mgKOH/g or more,

[Chem. 1]

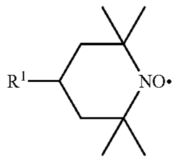

(1)

where in the formula (1), $R^1$ represents H—, O═, or $R^2$—COO—, and $R^2$ represents an alkyl group having 1 to 6 carbon atoms or a substituted or unsubstituted aromatic ring.

2. The radiation curable ink jet composition according to claim 1, wherein the hindered amine compound has a molecular weight of 250 or more.

3. The radiation curable ink jet composition according to claim 1, wherein a content of the hindered amine compound with respect to a total mass of the radiation curable ink jet composition is 0.5 percent by mass or less.

4. The radiation curable ink jet composition according to claim 1, wherein the polymerizable compound includes a vinyl group-containing (meth)acrylate represented by the following general formula (3), $$H_2C{=}CR^5{-}CO{-}OR^6{-}O{-}CH{=}CH{-}R^7 \quad (3)$$

where in the formula (3), $R^5$ represents a hydrogen atom or a methyl group, $R^6$ represents a divalent organic residue having 2 to 20 carbon atoms, and $R^7$ represents a hydrogen atom or a monovalent organic residue having 1 to 11 carbon atoms.

* * * * *